(12) United States Patent
Satou

(10) Patent No.: US 9,364,899 B2
(45) Date of Patent: Jun. 14, 2016

(54) TOOL HOLDER ON WHICH NONROTATIONAL TOOL OF MACHINING CENTER IS MOUNTED

(71) Applicant: FANUC Corporation, Yamanashi (JP)

(72) Inventor: Yoshikazu Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 84 days.

(21) Appl. No.: 14/206,447

(22) Filed: Mar. 12, 2014

(65) Prior Publication Data

US 2014/0271014 A1 Sep. 18, 2014

(30) Foreign Application Priority Data

Mar. 13, 2013 (JP) .............................. 2013-001357 U

(51) Int. Cl.
| | |
|---|---|
| B23P 23/02 | (2006.01) |
| B23C 9/00 | (2006.01) |
| B23B 29/12 | (2006.01) |
| B23Q 3/12 | (2006.01) |
| B23Q 37/00 | (2006.01) |
| B23B 3/06 | (2006.01) |

(Continued)

(52) U.S. Cl.
CPC ................ B23B 29/12 (2013.01); B23B 3/065 (2013.01); B23B 29/04 (2013.01); B23Q 3/12 (2013.01); B23Q 16/06 (2013.01); B23Q 37/002 (2013.01); B23C 9/005 (2013.01); B23Q 2220/008 (2013.01); Y10T 29/5112 (2015.01); Y10T 409/30448 (2015.01); Y10T 409/309296 (2015.01)

(58) Field of Classification Search
CPC ............. Y10T 409/309296; Y10T 409/30448; Y10T 29/5112; Y10T 483/1705; Y10T 483/1707; B23B 29/12; B23Q 2220/008; B23Q 37/002; B23Q 2230/002; B23C 9/005
USPC ................ 409/230, 144; 29/27 A; 483/18, 19
See application file for complete search history.

(56) References Cited

U.S. PATENT DOCUMENTS 4,596,502 A * 6/1986 Cattani ................... B23B 29/04
 408/234
4,777,713 A * 10/1988 Kitamura ................ B23B 3/065
 29/27 C (Continued)

FOREIGN PATENT DOCUMENTS

EP 259517 A1 * 3/1988
EP 2 505 285 A1 10/2012

(Continued)

OTHER PUBLICATIONS

Machine Translation JP 2003-231034, which JP '034 was published Aug. 2009.*

*Primary Examiner* — Erica E Cadugan
(74) *Attorney, Agent, or Firm* — Hauptman Ham, LLP

(57) ABSTRACT

A tool holder on which a nonrotational tool is mounted is mounted on a spindle of a machining center. A tool holder body of the tool holder includes a positioning pin that is inserted into the machining center and a locking mechanism. When the positioning pin is not inserted into the machining center, the locking mechanism locks the rotation of the tool holder body relative to a drive shaft. When the positioning pin is inserted into the machining center, the locking mechanism allows the rotation of the tool holder body relative to the drive shaft.

1 Claim, 2 Drawing Sheets

(51) Int. Cl.
 *B23Q 16/06* (2006.01)
 *B23B 29/04* (2006.01)

(56) References Cited

U.S. PATENT DOCUMENTS

| | | | | |
|---|---|---|---|---|
| 4,795,293 | A * | 1/1989 | Mizoguchi | B23Q 1/0027 408/59 |
| 5,564,872 | A * | 10/1996 | Veil | B23Q 1/0009 33/561 |
| 6,073,323 | A | 6/2000 | Matsumoto | |
| 7,367,097 | B2 * | 5/2008 | Nakamura | B23B 1/261 29/27 C |
| 7,563,062 | B1 * | 7/2009 | Chen | B23Q 5/045 408/124 |
| 8,790,054 | B2 * | 7/2014 | Hongou | B23B 29/04 173/164 |
| 2010/0101383 | A1 * | 4/2010 | Ito | B23B 3/06 82/120 |
| 2011/0107573 | A1 * | 5/2011 | Fujioka | B23B 29/04 29/27 A |

FOREIGN PATENT DOCUMENTS

| | | | |
|---|---|---|---|
| JP | 5-70842 U | | 9/1993 |
| JP | 09-029574 A | * | 2/1997 |
| JP | 10-015715 A | * | 1/1998 |
| JP | 11-10485 A | | 1/1999 |
| JP | 2003-181736 A | * | 7/2003 |
| JP | 2003-231034 A | * | 8/2003 |
| JP | 2005-329493 A | | 12/2005 |
| JP | 2012-213826 A | | 11/2012 |

* cited by examiner

TOOL HOLDER ON WHICH NONROTATIONAL TOOL OF MACHINING CENTER IS MOUNTED

RELATED APPLICATIONS

The present application claims priority to Japanese Utility Model Application No. 2013-001357U, filed Mar. 13, 2013.

BACKGROUND OF THE INVENTION

1. Field of the Invention

The present invention relates to a tool holder on which a nonrotational tool of a machining center is mounted.

2. Description of the Related Art

While tools mounted on a spindle are automatically exchanged, a machining center that is used as one of machine tools can perform various kinds of machining by the respective tools. The spindle is rotated about a central axis by the drive of a motor. When machining performed by a rotating tool, such as drilling, tapping, or milling, is performed by the machining center, rotating tools such as a drill used in these kinds of machining are mounted on the lower end portion of the spindle through a tool holder and perform the machining of a workpiece by rotating while moving up and down together with the spindle.

On some machining centers, not only rotating tools but also nonrotational tools such as turning tools are mounted. A turning tool is a tool that performs lathe turning on the surface of a workpiece while the tip of the tool is pressed against the workpiece which is rotating. The turning tool itself needs to be fixed so as not to rotate.

Various techniques for stopping the turning of a nonrotational tool are disclosed as follows.

Japanese Patent Application Laid-Open (JP-A) No. 2005-329493 discloses a technique for stopping the turning of a turning tool, in which a disc-shaped flange is formed in a tool holder that holds a turning tool, keyways are formed on the outer periphery of the flange at two locations which face each other in a radial direction, and keys are provided in a spindle head that supports a spindle. In this technique, when a cutting tool is mounted on the spindle, the keys of the spindle head are engaged with the keyways of the flange of the tool holder, thereby restricting the rotation of the tool holder and preventing the turning of the turning tool.

JP-A No. 2012-213826 discloses a technique for stopping the turning of a turning tool, in which a turning preventing flange is formed on the outer periphery of a tool holder that holds a cutting tool so as to protrude to the outside in a radial direction, two engaging holes are formed in the turning preventing flange coaxial with the tool holder, and engaging protrusions are provided on a spindle head so that they can be engaged with these two engaging holes, respectively. In this technique, when the engaging protrusions provided on the spindle head are engaged with these two engaging holes, the turning of the turning tool is prevented.

Japanese Utility Model Application Laid-Open No. 5-70842 discloses a technique for stopping the turning of a turning tool, in which a pin is provided so that it protrudes from a tool holder that holds a turning tool, and a positioning block is provided on a spindle head so that it can be engaged with the pin. In this technique, when the positioning block is engaged with the pin, the turning of the turning tool is prevented.

JP-A No. 11-10485 discloses a technique for stopping the turning of a turning tool, in which couplings each having a plurality of teeth formed inside a spindle head are mounted on the outer periphery of a spindle and the inner periphery of the spindle head, respectively. In this technique, when the couplings of the spindle and those of the spindle head mesh with each other, the rotation of the spindle is restricted, thereby preventing the turning of a turning tool.

The techniques disclosed in the above-mentioned patent documents are employed as a countermeasure for preventing the turning of the tool when the tool holder is mounted on the spindle, a countermeasure for maintaining the posture of the tool, and a countermeasure for stiffness against a machining load. Here, machining, such as lathe turning using a nonrotational tool, is performed in a manner such that a spindle is not rotated in order to fix the nonrotational tool. However, a machining center is formed on the premise of the use of rotating tools. For this reason, if the machining center receives a large cutting load or repeated vibration during the stop of the spindle, a load is applied while bearings in the spindle are fixed. Accordingly, since only a part of the bearings are damaged, there is a concern that the life of the spindle may be shortened.

Further, when the tool holder is mounted on the spindle and an improper operation for starting the spindle is performed with the tool holder fixed without turning, there also is a concern that damage to the spindle may be caused.

SUMMARY OF THE INVENTION

An object of the invention is to provide a tool holder on which a nonrotational tool of a machining center is mounted and which does not shorten the life of a spindle and does not cause damage to the spindle despite an improper operation.

According to an aspect of the invention, there is provided a tool holder on which a nonrotational tool of a machining center is mounted. The tool holder includes a sleeve that is fitted to a spindle on which the tool holder is mounted, a drive shaft that is connected to the sleeve, a tool holder body that is supported to be rotatable relative to the drive shaft, and a tool holding unit which is fixed to the tool holder body and on which the nonrotational tool is mounted. The tool holder body includes a positioning pin that is inserted into the machining center, and a locking mechanism. The locking mechanism locks the rotation of the tool holder body relative to the drive shaft when the positioning pin is not inserted into the machining center. And the locking mechanism allows the rotation of the tool holder body relative to the drive shaft when the positioning pin is inserted into the machining center.

With the configuration of the present invention described above, it is possible to provide a tool holder on which a nonrotational tool of a machining center is mounted and which does not shorten the life of a spindle and does not cause damage to a spindle despite an improper operation.

BRIEF DESCRIPTION OF THE DRAWINGS

The above and other objects and features of the present invention will be apparent from the detailed description of the following embodiments with reference to the accompanying drawings in which.

DETAILED DESCRIPTION OF THE PREFERRED EMBODIMENTS

Figure 1:
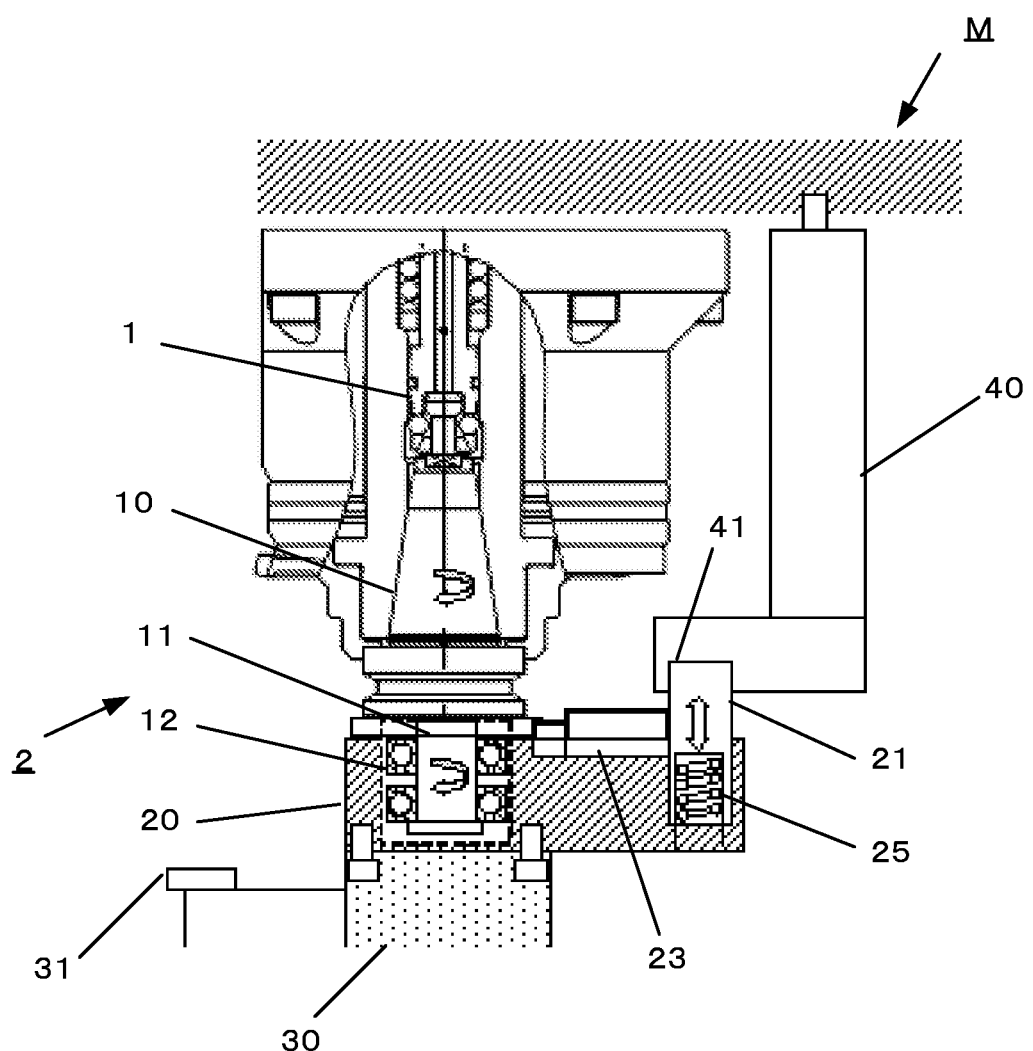
FIG. 1 is a side view of a machining center in which a tool holder on which a nonrotational tool is mounted, according to an embodiment of the invention, is mounted on a spindle.

A machining center according to an embodiment of the invention will be described with reference to FIG. 1. A tool holder on which a nonrotational tool is mounted is mounted on a spindle of the machining center.

The machining center M includes a spindle 1, and the spindle 1 is configured to be rotatable by a spindle motor (not illustrated). Further, the machining center M includes a positioning block 40, and the rotation of a tool holder body 20 of a tool holder 2 is prevented by the positioning block 40 as described below so that the tool holder body 20 can be fixed.

The tool holder 2 includes a tapered sleeve 10, a drive shaft 11, the tool holder body 20, and a tool holding unit 30, and a nonrotational tool 31 is mounted on an end portion of the tool holding unit 30.

The tapered sleeve 10 of the tool holder 2 is fitted to the spindle 1 of the machining center M. A cut-out portion 14 (see FIGS. 2 and 3), which is engaged with a protruding portion 24 of a locking mechanism 23 of the tool holder body 20 to be described below, is formed on the outer peripheral surface of the tapered sleeve 10.

The drive shaft 11 is directly connected to the tapered sleeve 10, and is rotated integrally with the tapered sleeve 10.

The tool holder body 20 is provided with a positioning pin 21, a spring 25 that presses the positioning pin 21, a bearing 12, and the locking mechanism 23 that includes the protruding portion 24.

The bearing 12 has a function of allowing the spindle 1, the tapered sleeve 10, and the drive shaft 11 to be rotatable at the time of an unlocked state to be described below.

The tool holding unit 30 is mounted on the lower surface of the tool holder body 20, and the nonrotational tool 31 is mounted on the end portion of the tool holding unit 30.

Next, mounting and removal of the tool holder 2, and a locked state and an unlocked state, which are made by the locking mechanism 23, will be described.

Figure 2:
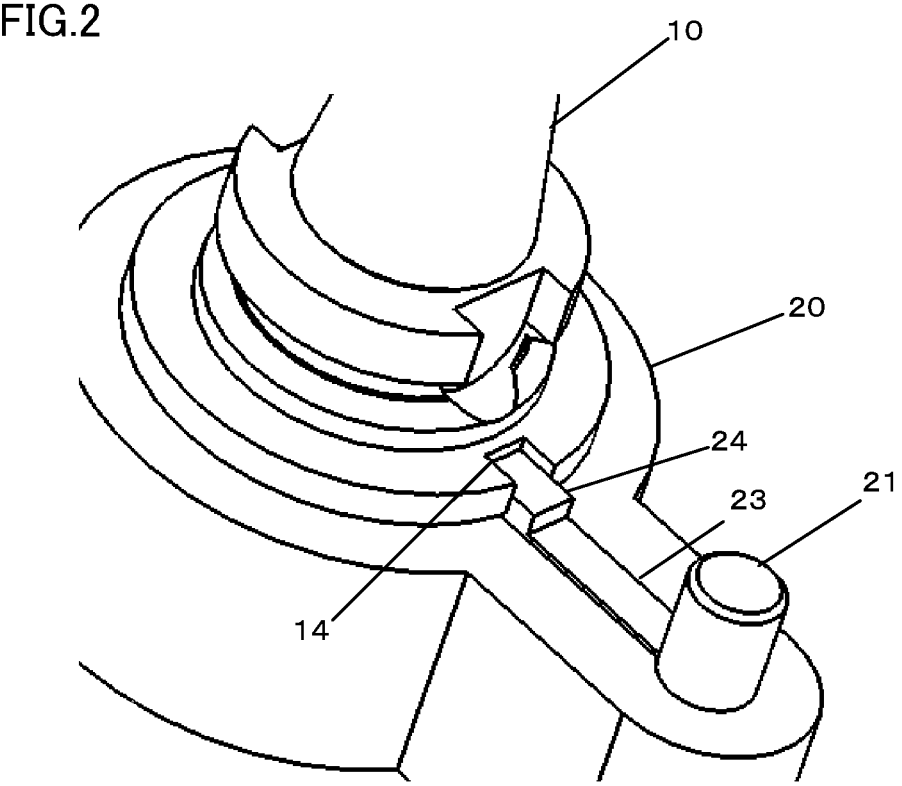
FIG. 2 is a perspective view illustrating that a tapered sleeve and a tool holder body of the machining center of FIG. 1 are in a locked state.

Mounting of the tool holder 2 is carried out when the spindle 1 of the machining center M is in a stopped state. Until the mounting of the tool holder 2 is completed, the locked state of the tool holder 2 as illustrated in FIG. 2 is maintained. That is, the protruding portion 24 of the locking mechanism 23 of the tool holder body 20 is engaged with the cut-out portion 14 of the outer peripheral surface of the tapered sleeve 10, so that the tapered sleeve 10 and the tool holder body 20 can be rotated integrally with each other.

Figure 3:
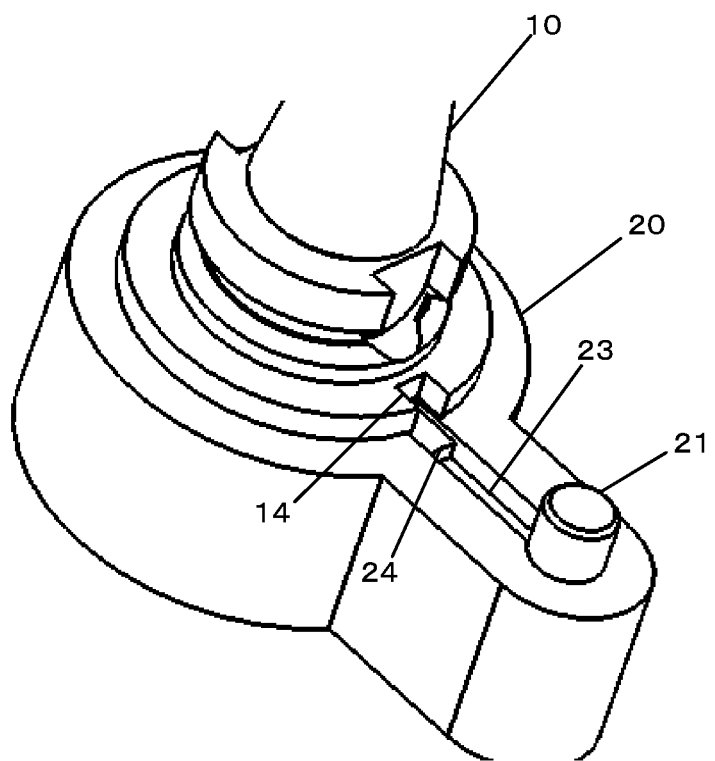
FIG. 3 is a perspective view illustrating that the tapered sleeve and the tool holder body of the machining center of FIG. 1 are in an unlocked state.

When the mounting of the tool holder 2 is completed, the unlocked state illustrated in FIG. 3 is made. At this time, the positioning pin 21 of the tool holder body 20 is inserted into a positioning hole 41 of the positioning block 40 of the machining center M as illustrated in FIG. 1 and the positioning pin 21 is pushed down against an elastic force of the spring 25. Since the locking mechanism 23 is also pushed down as the positioning pin 21 is pushed down, the engagement between the protruding portion 24 and the cut-out portion 14 of the tapered sleeve 10 is released. Accordingly, the unlocked state is made, the spindle 1 can be rotated integrally with the tapered sleeve 10, and the tool holder body 20 is not rotated together with the tapered sleeve 10. Further, since the positioning pin 21 is inserted into the positioning hole 41 of the positioning block 40 of the machining center Mat this time, the tool holder body 20 and the tool holding unit 30 are fixed so as not to rotate.

In this embodiment, the positioning block 40 is provided in the machining center M in order to prevent the rotation of the tool holder body 20 and the rotation of the tool holder body 20 is prevented by the insertion of the positioning pin 21 into the positioning hole 41 of the positioning block 40. However, it is unnecessary to provide an exclusive member for preventing the rotation of the positioning pin 21 in the machining center M, and it is possible to prevent the rotation of the positioning pin 21 by a body of the machining center M or by a member other than the machining center M.

Further, the tapered sleeve 10 having a tapered shape is used as a sleeve in this embodiment, but it is not necessary for the sleeve to have a tapered shape.

The invention claimed is:

1. A tool holder which is detachably attachable to a spindle of a machining center, and on which tool holder a nonrotational cutting tool is mounted, the tool holder comprising:
   a sleeve that is fitted to the spindle, on which spindle the tool holder is mounted;
   a drive shaft that is connected to the sleeve;
   a tool holder body that is supported to be rotatable relative to the drive shaft; and
   a tool holding unit which is fixed to the tool holder body and on which the nonrotational tool is mounted,
   wherein the tool holder body includes a positioning pin that is inserted into the machining center, and the tool holder body also includes a locking mechanism,
   the locking mechanism locks the rotation of the tool holder body relative to the drive shaft when the positioning pin is not inserted into the machining center, and
   the locking mechanism allows the rotation of the tool holder body relative to the drive shaft when the positioning pin is inserted into the machining center.

* * * * *